United States Patent [19]

van der Aa

[11] 4,421,099

[45] Dec. 20, 1983

[54] SOLAR COLLECTOR

[75] Inventor: Herman H. M. van der Aa, Eindhoven, Netherlands

[73] Assignee: U.S. Philips Corporation, New York, N.Y.

[21] Appl. No.: 320,364

[22] Filed: Nov. 12, 1981

[30] Foreign Application Priority Data

Dec. 11, 1980 [NL] Netherlands .......................... 8006717

[51] Int. Cl.³ ............................................. F24J 3/02
[52] U.S. Cl. ..................................... 126/433; 126/443
[58] Field of Search ............... 126/433, 434, 443, 418, 126/446, 418; 165/104.21

[56] References Cited

U.S. PATENT DOCUMENTS 4,311,131  1/1982  Sabet .................................... 126/433
4,313,423  2/1982  Mahdjuri ............................. 126/433

FOREIGN PATENT DOCUMENTS 56-113947  9/1981  Japan .................................... 126/418

Primary Examiner—James C. Yeung
Attorney, Agent, or Firm—Rolf E. Schneider

[57] ABSTRACT

There is provided a solar collector comprising a heat pipe having an evaporator section and a condenser section, together with an absorber plate thermally conductively connected to the evaporator section, one side of the absorber plate being provided with a layer for the selective absorption of incident solar heat. An evacuated transparent envelope encloses the absorber plate and the evaporator section. A part of the evaporator section is free of the absorber plate and is provided with a separate layer for the selective absorption of incident solar heat, such separate layer having the same heat absorption coefficient as but a higher heat emission coefficient than the layer on the absorber plate per unit of length of the evaporator section.

7 Claims, 6 Drawing Figures

SOLAR COLLECTOR

This invention relates to a solar collector comprising a plate-shaped absorber which is provided on at least one side with a black layer for the selective absorption of incident solar heat, said solar heat absorber plate being arranged in heat-exchange contact with the evaporator section of a heat pipe whose condenser section can be arranged to exchange heat with a medium to be heated, the evaporator section and the absorber plate being enclosed in an evacuated transparent envelope.

A solar collector of this type is known, for example, from U.S. Pat. No. 4,119,085. For this kind of solar collector it is important that the light incident on the absorber surface is converted into heat with as high an efficiency as possible and that as little as possible of the collected heat is lost by radiation. In order to achieve the foregoing, the absorber plate is provided with a black layer which selectively absorbs heat. This layer may be formed of, for example, cobalt sulphide and have a heat absorption coefficient $\alpha \geq 0.9$ and a heat emission coefficient $\epsilon \leq 0.3$.

Via the heat pipe, the collected heat is exchanged with or transferred to a medium in a separate system for example, a water boiler or a space-heating system. The temperature and/or the pressure in the heat pipe generally may not exceed a given maximum value. In order to ensure that the maximum condenser section temperature is not exceeded, it is known to cause the heat transfer to be interrupted at a given temperature by appropriate selection of the kind and the quantity of the evaporable heat transport medium used in the heat pipe.

However, for some heat transport media in the heat pipe it is not possible to utilize this method, because the critical temperature of the relevant heat transport medium is higher than the permissible maximum temperature and only a little liquid has changed to the vapour phase even at the maximum operating temperature.

The present invention has for its object to provide a solar collector in which the heat transfer via the heat pipe is automatically interrupted when an excessively high temperature is reached, even when a heat transport medium is used which has a critical temperature which is higher than the maximum permissible temperature.

The solar collector in accordance with the invention is characterized in that a part of the heat pipe which is situated within the transparent envelope is free of the absorber plate, said free part being arranged to exchange heat with one or more layers which have the same absorption coefficient as but a higher radiation loss than the layer on the absorber plate per unit of length of the evaportor section of the heat pipe.

The side of the absorber plate of the solar collector in accordance with the invention which faces the sun is provided with a black layer which selectively absorbs the solar heat; layers of this kind may consist of, for example, nickel oxide or copper oxide or cobalt sulphide. The absorption coefficient of such a layer is high, $\epsilon \geq 0.9$, whilst the radiation losses are low, $\epsilon \leq 0.3$. The other side of the absorber plate is not black, so it exhibits only low radiation losses.

The free part of the heat pipe is in thermal contact with one or more layers having the same absorption coefficient as the layer on the absorber plate but exhibiting a higher radiation loss than the layer on the absorber plate.

The radiation loss of a layer increases by $T^4$. This means that the difference in radiation loss between the layer on the absorber plate and said free layer or layers on said part of the heat pipe will be small in the case of low temperatures. In this temperature range, the temperature of the free part of the heat pipe will deviate only a little from that of the remainder of the evaporator section of the heat pipe, so that the condenser section will in any case have a lower temperature. Therefore heat will be transported to the condenser section.

As the temperature rises, the radiation losses of the free part of the heat pipe will rise faster than those of the remainder of the evaporator section.

At the normal operating temperature, the radiation losses of the free part of the heat pipe will not influence the proper operation of the solar collector, or only hardly so. When the temperature rises beyond the normal operating temperature, the radiation losses of the free part of the heat pipe will increase very quickly, so that a situation is reached in which all collected heat is lost by radiation via the free evaporator section part. A further temperature rise is thus prevented.

A preferred embodiment of the solar collector in accordance with the invention is characterized in that the part of the heat pipe which is free of the absorber plate is located at the end of the heat pipe which is remote from the condenser section.

When the radiation losses of the free part of the heat pipe become high in this embodiment, part of the heat transport medium in the heat pipe will condense in the free end portion thereof, after which the condensate will not have the opportunity to participate in the heat-transport cycle again. In order to obtain the desired radiation loss, said free evaporation section part may be completely covered by a black, non-selectively heat absorbing layer. A non-selectively absorbing layer has the same absorption coefficient as the layer on the absorber plate, for example $\alpha \geq 0.9$, but the emission coefficient is also of the order of, for example $\epsilon \leq 0.3$.

Therefore, for the free part of the heat pipe this means higher radiation losses, notably at higher temperatures. In a further preferred embodiment, the end part of the heat pipe which is remote from the condenser section is formed with a further and separate absorber plate which is provided on at least one side with a black layer having an absorption coefficient which equals that of the black layer on the absorber plate, said further absorber plate having higher radiation losses than the absorber plate.

The latter result can be achieved by providing the further absorber plate on one side or on both sides with a black layer having an emission coefficient which is higher than that of the black layer on the absorber plate.

It is alternatively possible to provide the side of the further absorber plate which is remote from the absorption side thereof with surfaces which increase the radiating surface area of the further absorber plate.

In order to prevent an excessive flow of heat from the absorber plate to the free part of the heat pipe due to thermal conduction, in a further embodiment in accordance with the invention, a thermal resistance is provided between said free part and the remainder of the heat pipe. The thermal resistance may be provided by forming a part of the heat pipe with a smaller diameter than the remainder of the heat pipe.

The invention will now be described in detail with reference to the accompanying drawings, in which.

Figure 1:
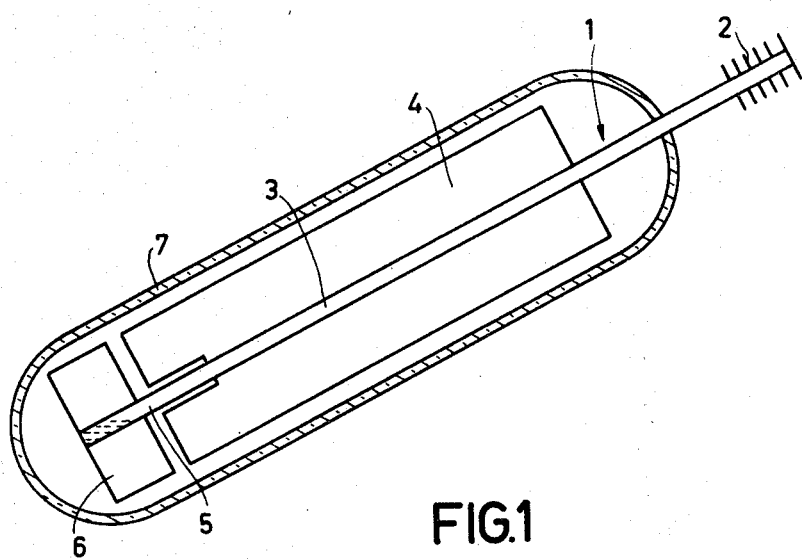
FIG. 1 shows diagrammatically a solar collector.

Reference numeral 1 in FIG. 1 denotes a heat pipe. The heat pipe comprises a condenser section 2 and an evaporator section 3. The heat pipe is filled in a customary manner with a heat transport medium, for example water, which transports heat by means of an evaporation/condensation cycle.

Thermally conductively connected to the evaporator section 3 is an absorption plate 4, the absorber side of which is provided with a black layer which selectively absorbs the incident solar heat; that is to say, this layer has a high absorption coefficient ($\alpha \geq 0.9$) and at the same time low radiation losses ($\epsilon \leq 0.3$).

A part 5 of the heat pipe at the end thereof remote from the condenser section 2 is free of the absorber plate 4. A further absorber plate 6 is arranged on this part 5.

The evaporator section 3, the absorber plate 4, the free part 5 and the plate further absorber 6 are enclosed in a transparent envelope 7 in which a sub-atmospheric pressure prevails.

The operation of the solar collector is as follows. The solar radiation incident on the absorber plate 4 is converted into heat with a high efficiency by the black layer on the absorber plate 4. Because the emission coefficient of the black layer is low, the temperature of the absorber plate will quickly rise to a value at which the heat transport medium in the heat pipe 1 starts to evaporate. At the same time, the temperature of the further absorber plate 6, which is provided, at least on the side receiving the incident solar radiation, with a black layer having the same absorption coefficient per unit of length of the heat pipe as the black layer on the absorber plate, has increased to the evaporation temperature of the heat transport medium.

The evaporated heat transport medium then flows to the colder condenser section 2 which exchanges heat via its cooling fins, with a medium to be heated.

The solar collector described thus far operates substantially in the same way as the known solar collector.

If the exchange of heat from the condenser section 2 were to cease for some reason, the temperature of the the condenser section would increase and tend to exceed a given permissible value. In order to prevent this, it is ensured in accordance with the invention that the further absorber plate 6 has higher radiation losses than the absorber plate 4.

This can be achieved in various ways.

Figure 2:
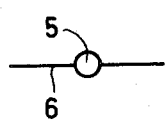
FIGS. 2, 3 and 4 are end views of three feasible embodiments of a part of the solar collector shown in FIG. 1.
Figure 3:
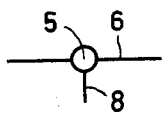
Figure 4:
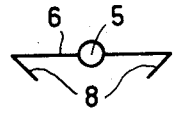

FIG. 2 is an end view of an embodiment of the further absorber plate 6 which has the same dimension as the absorber plate 4 measured transversely of the heat pipe. Higher radiation losses from the further absorber plate 6 can be obtained in this embodiment by any of the following measures:

a. providing the upper side of the further absorber plate 6, i.e. the side which receives the incident solar radiation, with a black, non-selectively absorbing layer; the absorption coefficient of the further absorber plate 6 then equals that of the absorber plate 4, whilst radiation losses in the upward direction are much higher than those of the absorber plate 4;

b. providing the upper side and the lower side of the further absorber plate 6 with a black non-selectively absorbing layer;

c. providing both sides of the further absorber plate 6 with a black selectively absorbing layer; the upper side is then completely comparable with the absorber plate but the lower side will exhibit higher radiation losses;

d. providing the further absorber plate 6 on its upper side with a black selectively or non-selectively absorbing layer and, as shown in FIGS. 3 and 4, on its lower side with surface-increasing parts 8 which do not participate in the absorption but which do radiate heat.

As is known, radiation losses of surfaces increase in proportion to $T^4$. This means that for the chosen operating temperature of the solar collector, that radiation losses of the further absorber plate 6 may be comparatively low. Should the temperature of the condenser section 2 and hence of the entire heat pipe rise for some reason, the radiation losses of the further absorber plate 6 would strongly increase. This means that the heat will be transported to a smaller extent to the condenser section 2 and to an increasing extent to the further absorber plate 6. The heat transport medium in the free part 5 of the heat pipe will then condense and, because this is the lowest part, the condensate will remain at this area and will no longer participate in the heat-transport cycle. In due course all the heat transport medium will be concentrated at this area, so that the heat transport from the absorber plate 4 to the condenser section 2 will have been completely interrupted. Automatic protection against overheating is thus obtained in a simple manner.

Figure 5:
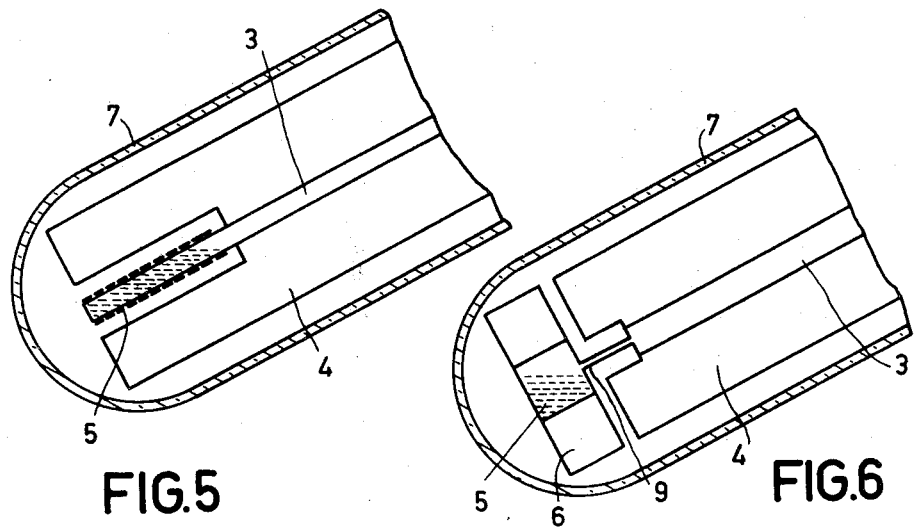
FIGS. 5 and 6 each shows diagrammatically a part of a solar collector on an enlarged scale.

In the embodiment shown in FIG. 1, the free part 5 of the heat pipe is provided with a further absorber plate 6 having a black layer. However, in certain circumstances it may suffice to provide the free part 5 itself with a black non-selectively absorbing black layer, as shown in FIG. 5. If the temperature rises too high, this layer will ensure that the radiation losses of this free part of the heat pipe bacome so high that the operation of the solar collector is interrupted and all the heat transport medium collects in the free part 5.

Figure 6:
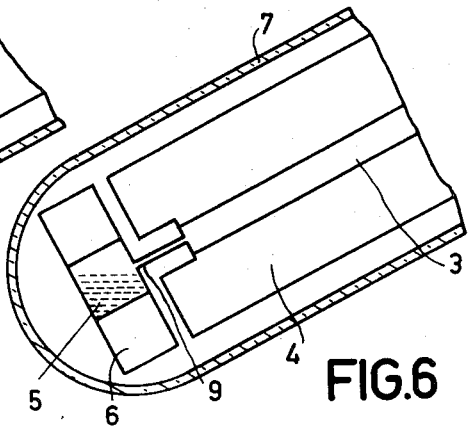

In certain circumstances it may occur that the above-described operation of the free part 5 of the heat pipe is influenced too much by thermal conduction in the wall of the heat pipe. In order to counteract this phenomenon, a thermal resistance may be provided between the free part 5 and the remainder of the evaporator section 3. Such a thermal resistance may, for example, be formed as shown in FIG. 6, i.e. by giving a part 9 of the heat pipe a diameter which is smaller than that of the remainder of the heat pipe.

What is claimed is:

1. A solar collector, which comprises a heat pipe having an evaporator section and a condenser section; a solar heat absorber plate thermally conductively connected to the evaporator section, one side of said absorber plate being provided with a layer for the selective absorption of incident solar heat; and an evacuated transparent envelope enclosing the absorber plate and the evaporator section, a part of the evaporator section being free of the absorber plate and being provided with a separate layer for the selective absorption of incident solar heat, said separate layer having the same heat absorption coefficient as but a higher heat emission coefficient than the layer on the absorber plate per unit of length of the evaporator section.

2. A solar collector according to claim 1, in which the free part of the evaporator section is located at the end of the evaporator section remote from the condenser section.

3. A solar collector according to claim 2, in which the free part of the evaporator section is completely covered with a black, non-selectively heat absorption layer.

4. A solar collector according to claim 2, in which a further plate provided on at least one side with said separate heat absorption layer is thermally conductively connected to said free part of the evaporator section.

5. A solar collector according to claim 4, in which the side of said further plate remote from its heat absorption side is formed with surfaces increasing its radiating area.

6. A solar collector according to claim 1, in which said free part of the evaporator section is connected to the remainder of the evaporator section by means of a thermal resistance.

7. A solar collector according to claim 6, in which said thermal resistance is formed by part of the evaporator section having a diameter smaller than that of the remainder of the evaporator section.

* * * * *